(12) United States Patent
Fujii et al.

(10) Patent No.: US 6,256,139 B1
(45) Date of Patent: Jul. 3, 2001

(54) PLASTIC OPTICAL FIBER CONTINUOUS OPTICAL AMPLIFIER AND EXCITATION TUBE

(75) Inventors: Kazuhito Fujii, 4-1-1, Nukuikita Koganei, Tokyo 184-8501; Suguru Horinouchi, 46-1, Shishigaya 1-chome, Tsurumi-ku, Yokohama, Kanagawa 230-0074; Takayoshi Ishikawa, Yokohama, all of (JP)

(73) Assignees: Kazuhito Fujii, Tokyo; Suguru Horinouchi; Nippon Aleph Corporation, both of Yokohama, all of (JP)

( * ) Notice: Subject to any disclaimer, the term of this patent is extended or adjusted under 35 U.S.C. 154(b) by 0 days.

(21) Appl. No.: 09/286,656

(22) Filed: Apr. 6, 1999

(30) Foreign Application Priority Data

Apr. 7, 1998 (JP) ................................. 10-094819

(51) Int. Cl.[7] ........................................ H01S 3/00
(52) U.S. Cl. ..................... 359/341; 359/124; 359/342
(58) Field of Search ................... 359/341, 342, 359/124

(56) References Cited

U.S. PATENT DOCUMENTS

| | | |
|---|---|---|
| 4,015,217 | * 3/1977 | Snitzer . |
| 5,363,463 | * 11/1994 | Kleinerman . |
| 5,778,129 | * 7/1998 | Shukunami et al. . |

FOREIGN PATENT DOCUMENTS

| | | |
|---|---|---|
| 5-275789 | 10/1993 | (JP) . |
| 9-8388 | 1/1997 | (JP) . |

* cited by examiner

Primary Examiner—Stephen C. Buczinski
(74) Attorney, Agent, or Firm—Kanesaka & Takeuchi

(57) ABSTRACT

A plastic optical fiber continuous optical amplifier for continuously amplifying signal lights includes an exciting light tube with a double tube structure formed of an inner tube and an outer tube, and a plastic optical fiber (POF) coaxially provided inside the inner tube of the exciting light tube. The POF includes a core having an induced emission material therein and a larger refractive index, and a clad for holding the core and having a smaller refractive index than that of the core. The core and the clad are coaxially provided to the POF. It is preferable that electrodes of the exciting light tube have a ring shape to effectively excite.

20 Claims, 6 Drawing Sheets

PLASTIC OPTICAL FIBER CONTINUOUS OPTICAL AMPLIFIER AND EXCITATION TUBE

BACKGROUND OF THE INVENTION AND RELATED ART STATEMENT

This invention relates to a plastic optical fiber continuous optical amplifier or continuous optical amplifier for a plastic optical fiber, with continuous wave pump light. Also, this invention relates to an excitation tube for continuously amplifying a signal light by continuous wave light irradiation from a side of the plastic optical fiber.

Recently, a graded index type plastic optical fiber has been developed and an information transmission efficiency has been improved significantly. Since the plastic optical fiber with a high bandwidth/low loss has been developed, the information transmission with an optical fiber communication network is going to be used practically.

The plastic optical fiber (hereinafter referred to as "POF") amplifier amplifies the amplitude of a propagating signal light with an optical excitation. A POF amplifier which provides a pulse amplification is disclosed in Japanese Patent Publication (KOKAI) No. 5-275789. In this amplifier signal light and pump light are put in from an end face of POF doped with organic dye. This excitation is referred to as a coaxial direction excitation.

Also, in an amplifier disclosed in Japanese Patent Publication (KOKAI) No. 9-8388, there is mentioned a transverse excitation, wherein a pump light is emitted from an exciting light source; an optical amplification fiber is irradiated from the side face by the pump light to thereby form an inversion distribution (population inversion); and the light to be amplified is amplified by propagating in an axial direction of a core where the population distribution is formed, to thereby output the amplified signal light from an optical connector.

However, in the conventional POF amplifier as disclosed in Japanese Patent Publication No. 5-275789, since a pulse light is used as the pump light, the pump light is required to be synchronized with the signal light. Especially, in case a super high speed optical transmission is carried out in a field of communication, the synchronization is very difficult, so that a device for synchronizing becomes extremely complicated, and also, a laser generating device with a large output is necessary as an pump light generating device.

Further, although it is preferable to use the POF in view of selection of an induced emission material in order to carry out the optical amplification in a wide wavelength region, when high power pulsed laser as a pump source is irradiated for longer period, there is a problem to be solved such that a resin of the POF is dissolved.

Also, in the example disclosed in Japanese Patent Publication No. 9-8388, although pump light is irradiated from the side face of fiber, it remains in a concept of irradiating the pump light from only the side face, and no specific transverse excitation method nor exciting device that can be practiced actually is disclosed.

On the other hand, it is indispensable to provide an optical fiber network to each home by arrival of a multi-media society. As an equipment for connecting each home with a main network formed of glass series optical fibers, a POF with a large diameter, a connecting work of which is easy at a low cost, is likely to be introduced.

However, as to the glass series optical fiber, a continuous wave (hereinafter referred to as "CW") operating optical amplifier has already been used practically, but there is no CW operating optical amplifier for the POF. An optical amplifier having a simple structure at a cheaper cost, which can be introduced into a branch point or a home, has been demanded.

The present invention has been made in view of the above, and an object of the present invention is to provide a continuous optical amplifier for a POF for continuously amplifying a signal light.

Another object of the invention is to provide an excitation tube for an optical amplification by exciting a doped fluorescence or phosphorescence material, which will induce the induced emission (hereinafter this kind of material is referred to as "induced emission material) in POF amplifier.

A further object of the invention is to provide an excitation tube as stated above, which can be produced with dimensions to be used practically.

Further objects and advantages of the invention will be apparent from the following description of the invention.

SUMMARY OF THE INVENTION

To attain the above objects, according to a first aspect of the present invention, a POF continuous optical amplifier includes irradiation means, and a POF provided to the irradiation means, wherein the wavelength of pump light in the process of irradiation means is in the region of absorption spectrum of the induced emission material doped to POF; the irradiation means has a dependence of length on a doped area of the induced emission material in POF; and a CW or quasi-CW pump light from the irradiation means is irradiated to POF to thereby subject a signal light to continuous optical amplification.

In a second aspect of the present invention, the irradiation means is formed of a pump light irradiation device with a double tube structure for sealing an exciting gas or material therein, which has electrodes on both ends thereof having a ring shape, in addition to the structure described above.

In a third aspect of the present invention, the irradiation means is a luminescence device with a ring shape.

In a fourth aspect of the present invention, in addition to the above structure, a POF is coaxially fixed to the pump light irradiation device.

In a fifth aspect of the present invention, a POF is coaxially fixed to the pump light irradiation device with an adhesive having a good light transmittance at an absorption wavelength of the induced emission material and a bad light transmittance at the ultra-violet rays against promoting resolution of plastic.

In a sixth aspect of the present invention, in a transverse excitation of a POF, pump light of a pump light irradiation device is continuously irradiated to a POF to thereby subject a signal light to an optical amplification, wherein the following equations are satisfied:

(a) $rd/2RL \leq \sigma sa/\sigma pa \leq 7rd/2RL$, and (b) $\tau \sigma se > (\pi rdnE)(\sigma saLrd/\sigma pardW)$ wherein, rd represents a diameter of a dope area of the induced emission material; L represents the same length of the pump light irradiation device as that of the region doped with the induced emission material; σsa is an absorption cross section of a signal light wavelength of the induced emission material; σpa is an absorption cross section in the pump light wavelength of the induced emission material; σse is an emission cross section in the signal light wavelength of the induced emission material; R is a percentage of overlapping portions of the dope area of the induced emission material in a signal light intensity distribution; τ is a lifetime of the induced emission material; W is energy of the pump light; n is the refractive index of the pump light in the POF amplifier; and π represents the circle circumference ratio.

In a seventh aspect of the present invention, the length of the pump light irradiation device corresponding to the dope area of the induced emission material is in a range from 0.5 cm to 50 cm for practically convenient application.

In an eighth aspect of the present invention, a rare earth chelate is used as the induced emission material.

In a ninth aspect of the present invention, the induced emission material is substantially distributed symmetrically from a center of the POF.

In a tenth aspect of the present invention, a region where the intensity of the pump light irradiated from the side of POF is saturated to substantially coincide with a region where the induced emission material is doped.

In an eleventh aspect of the present invention, a luminescence spectrum including the signal light wavelength of the induced emission material doped to the POF is separated from an absorption spectrum including the pump light wavelength of the induced emission material, and the wavelength of the signal light is selected where the emission cross section in the induced emission material is almost maximum.

In a twelfth aspect of the invention, the induced emission material is selected such that the luminescence spectrum including the signal light wavelength of the induced emission material doped to the POF and the absorption region including the pump light wavelength of the induced emission material are separated, and that the maximum wavelength and signal light wavelength of the emission cross section in the signal light wavelength of the induced emission material substantially coincide with each other.

In a thirteenth aspect of the invention, the quasi-CW light, where the stop time of the irradiating operation is less than the lifetime τ of the induced emission material, is also applicable as a pump light source of the POF amplifier.

In the POF continuous optical amplifier of the invention having the structure as described above, continuous optical amplification of the signal light can be substantially carried out by the irradiation of a CW pump light or a quasi-CW pump light from the pump light irradiation device to the POF doped with induced emission material.

A fourteenth aspect of the invention resides in an exciting light tube for performing a transverse excitation by irradiating the pump light from the side of the POF. The exciting light tube continuously irradiates the pump light to the POF and has a length L satisfying the following equation:

$$rd/2RL \leq \sigma sa/\sigma pa \leq 7rd/2RL$$

wherein rd represents a diameter of a dope area of the induced emission material to the POF; L is the length of the exciting light tube same as that of an area doped with the induced emission material; σsa represents an absorption cross section at the signal light wavelength in the induced emission material; σpa is an absorption cross section at the pump light wavelength in the induced emission material; σse is an emission cross section at the signal light wavelength in the induced emission material; and R represents a percentage of an overlapping area doped with the induced emission material in the signal light intensity distribution.

In a fifteenth aspect of the invention, the exciting light tube carries out a CW irradiation or a quasi-Cw irradiation with irradiation stop time less than the lifetime τ of the induced emission material.

In a sixteenth aspect of the invention, the exciting light tube where the emission cross section in the signal light wavelength of the induced emission material doped to the POF and the absorption cross section at the pump light wavelength in the induced emission material are separated with respect to the wavelength, and the wavelength of pump light is slightly detuned from the wavelength at which the absorption cross section of the induced emission material becomes maximum.

In a seventeenth aspect of the invention, a length of the exciting light tube is in a range of 0.5 cm to 50 cm for practically convenient application.

In an eighteenth aspect of the invention, the exciting light tube is formed of a double tube structure having electrodes on both ends thereof and sealing therein an exciting gas or material whose luminescent wavelength overlaps with the absorption spectrum region of the induced emission material.

In the exciting light tube thus structured of the invention, through low exciting intensity irradiation of CW light or quasi-CW light with operation stop time less than the lifetime τ of the induced emission material, the induced emission material doped to the POF is subjected to light excitation to thereby substantially provide continuous optical amplification, and moreover, the POF amplifier and the exciting light tube can be produced with practically usable dimensions.

DETAILED DESCRIPTION OF THE PREFERRED EMBODIMENTS

Preferred embodiments of a POF continuous optical amplifier, i.e. continuous optical amplifier for a POF, and an excitation tube according to the present invention are described hereunder with reference to FIGS. 1 through 10.

Figure 1:
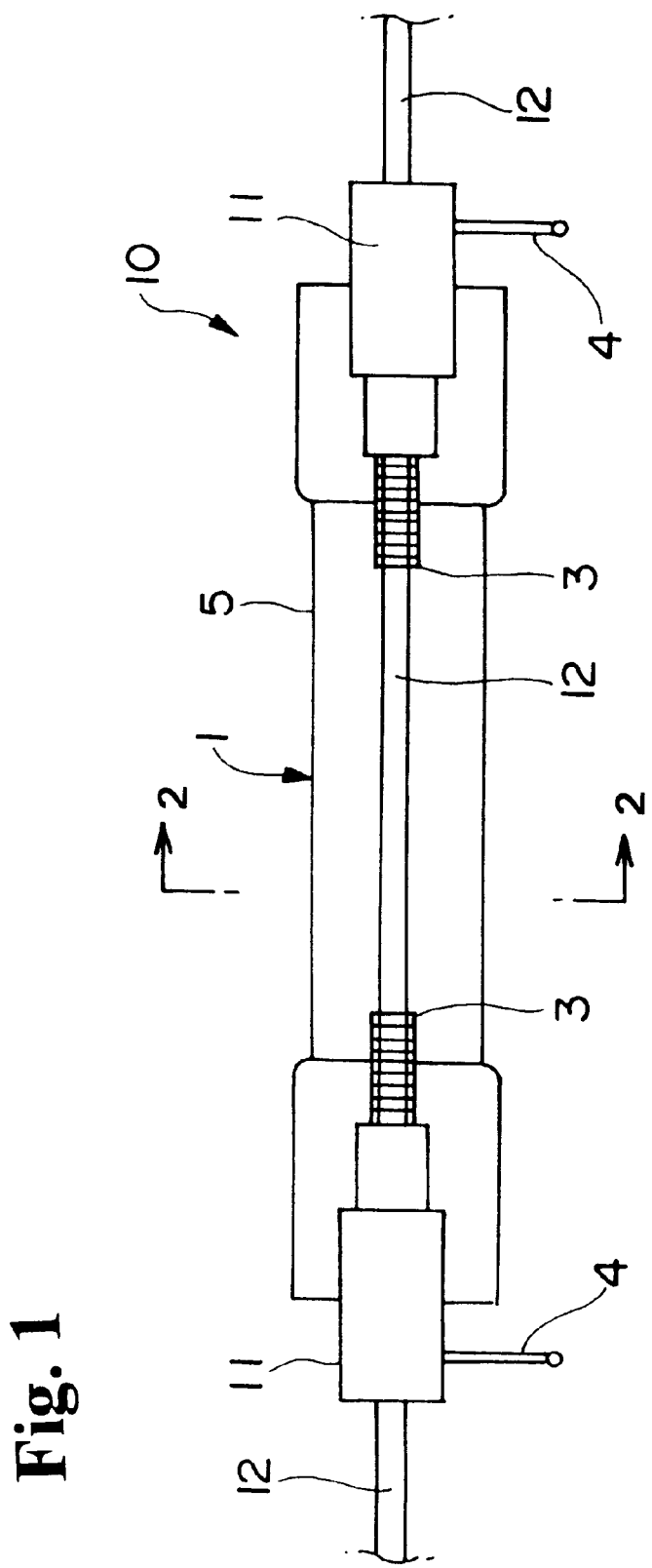
FIG. 1 is a side view for showing an external appearance of a POF continuous optical amplifier of the present invention.
Figure 2:
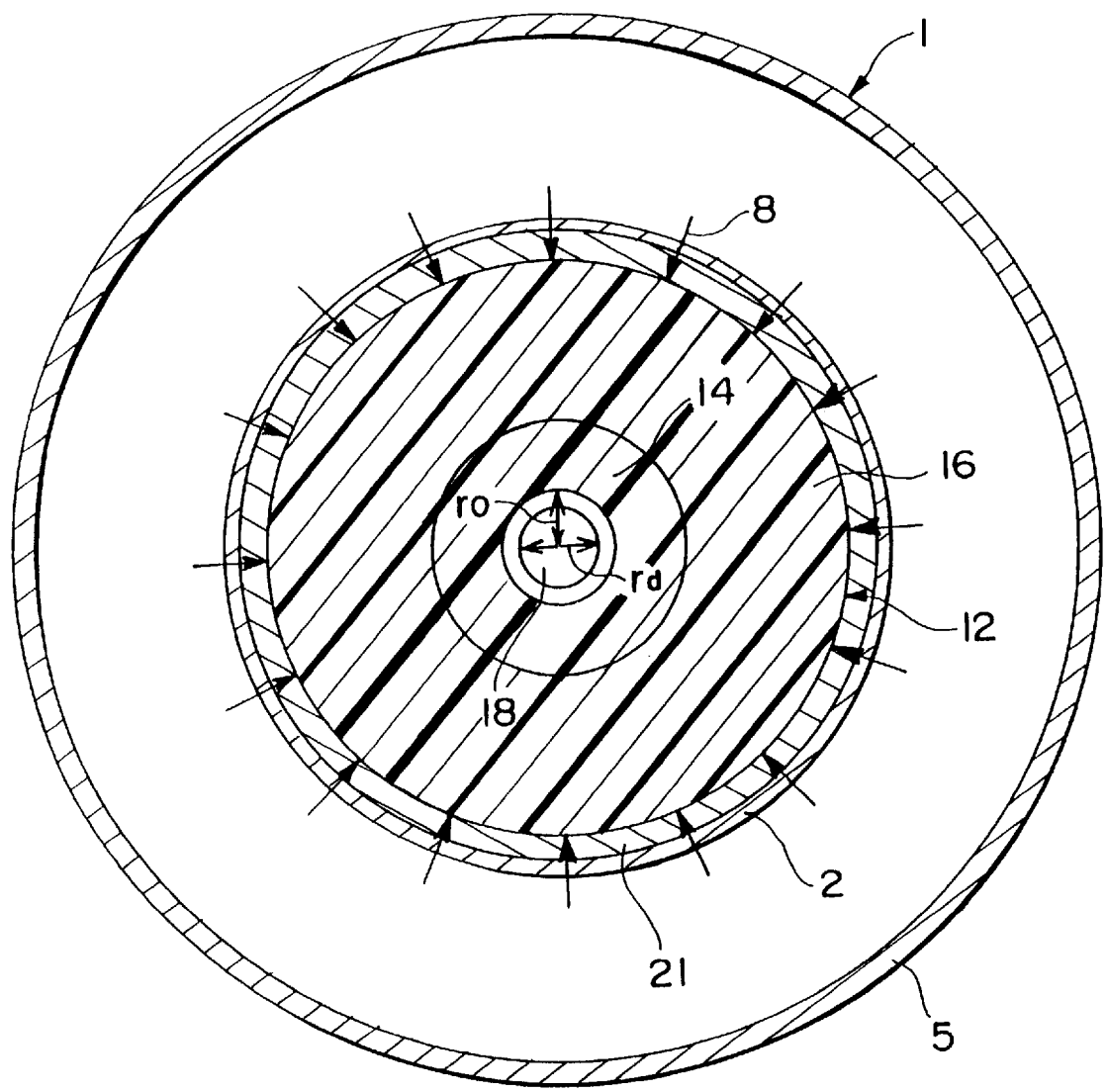
FIG. 2 is a sectional view taken along line 2—2 in FIG. 1.

FIG. 1 is a side view for showing an external appearance of the POF continuous optical amplifier of the present invention. FIG. 2 is a sectional view taken along line 2—2 in FIG. 1.

With reference to FIGS. 1 and 2, the POF continuous optical amplifier 10 of the invention includes an excitation tube 1 or pumping light source having a double tube structure formed of an inner tube 2 and an outer tube 5, and a POF 12 co-axially disposed in the inner tube 2 of the excitation tube 1. The POF 12 includes a core 14 with a large refractive index having an induced or stimulated emission material 18 therein, and a clad 16 covering the core 14 with a layer having a refractive index smaller than that of the core 14, which are arranged coaxially. It is preferable that each of electrodes 3 for the excitation tube 1 has a ring shape for effective excitation. Incidentally, in FIG. 1, reference numeral 4 denotes terminals, 11 represents a sealing agent, 21 is a holding member, such as an adhesive, for coaxially fixing the POF to the excitation tube.

It is preferable that the induced emission material 18 is substantially distributed symmetrically from a center of the POF 12. For example, the induced emission material 18 is distributed with a uniform density in the concentric cylinder of the core 14, or the induced emission material 18 may be distributed in an ellipse shape, the center of which coincides with a central axis of the core 14.

Figure 3:
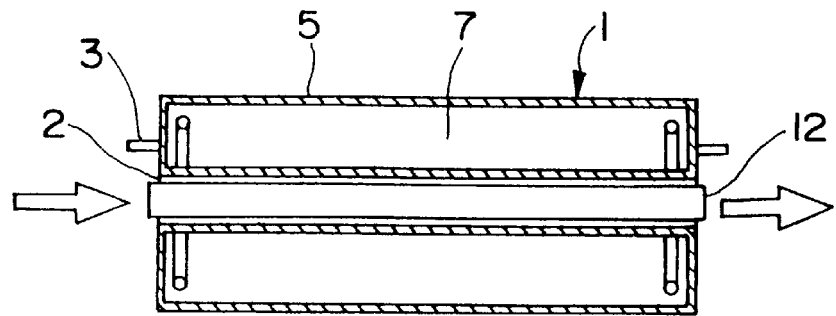
FIG. 3 is an explanatory sectional view of the POF continuous optical amplifier of the present invention.

FIG. 3 is a sectional view of the POF continuous optical amplifier of the present invention.

An excitation gas 7 to be sealed in the excitation tube 1 is selected such that a luminescence wavelength of the excitation tube 1 is within the absorption wavelength region of the induced emission material 18. In case the induced emission material 18 is excited by the ultra-violet rays, mercury is sealed as a principal component, and in case the absorption wavelengths are different, a rare earth compound or the like is sealed together with mercury.

For example, in case a neodymium chelate is selected as the induced emission material 18 and is doped to the POF, since the absorption wavelength of neodymium chelate is 642 nm, the excitation tube 1 may be made of manganese activation chlorogermane acid magnesium with a luminescence wavelength of 658 nm as a fluorescent material.

In case the excitation tube is a fluorescence tube including a fluorescent material, particularly, its pump light is not limited and a pump light wavelength can be freely selected, so that various kinds of the induced emission materials can be selected corresponding thereto.

Figure 4:
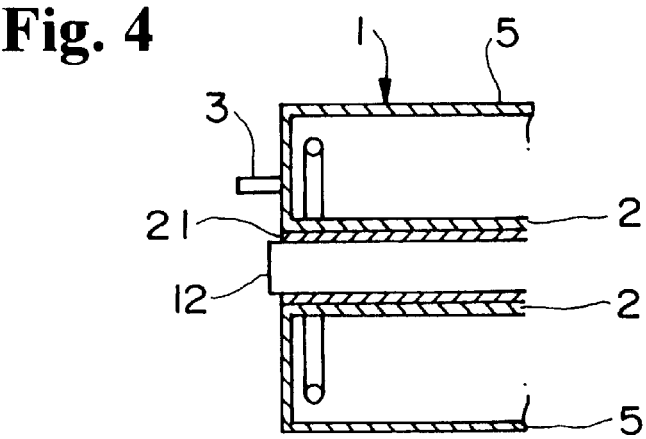
FIG. 4 is a partial sectional view of a fixing structure for fixing the POF of the POF continuous optical amplifier with an adhesive.
Figure 5:
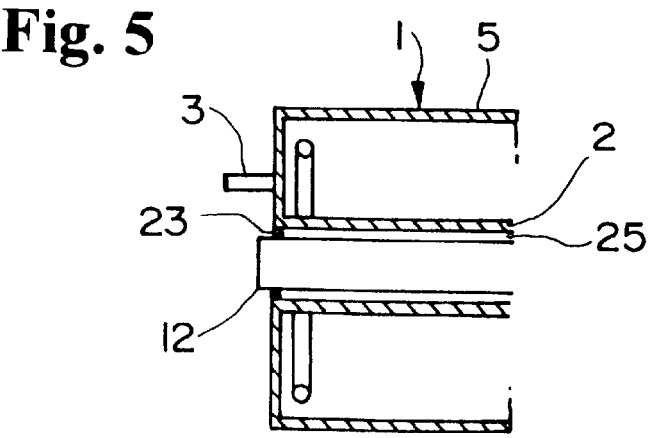
FIG. 5 is a partial sectional view of another fixing structure for fixing the POF of the POF continuous optical amplifier.

FIGS. 4 and 5 are partial sectional views for showing examples of the POF fixing structures of the POF continuous optical amplifier.

The POF 12 is preferably fixed to a central part of the excitation tube 1 so that the pump light can pass efficiently. As a fixing method thereof, for example, as shown in FIG. 4, by selecting an adhesive having a good light transmittance in an absorption wavelength of the induced emission material 18 and having a large absorption for ultra-violet rays promoting decomposition of plastic, the adhesive 21 is completely filled in a space between the inner tube 2 and the POF 12 to bond therebetween so that the pump light sufficiently reaches the POF 12.

As another fixing method, as shown in FIG. 5, the POF 12 is coaxially fixed inside the inner tube 2 through a rubber bush 23, such as an O ring, and oil 25 is enclosed in a space between the inner tube 2 and the POF 12. In selection of the oil 25, also, an oil having a good light transmittance in the absorption wavelength of the induced emission material and having a large absorption for ultra-violet rays for promoting decomposition of plastic, is selected.

Also, it is desirable to use the adhesive, oil or the like having a high thermal conductivity. Incidentally, by providing a reflecting film of the light to the outside of the excitation tube 1, it is possible to efficiently irradiate the induced emission material.

In case the excitation tube is formed of the double tubes, the optical alignment of the tubes or POF is not required, and the pump light can be easily concentrated on an area doped with the induced emission material.

The excitation light irradiation device is not limited to the excitation tube, and there may be used any structure wherein the pump light irradiated from the pump light irradiation device can effectively pass through the area doped with the induced emission material. For example, without forming the excitation tube with the double structure, the excitation light irradiation device is formed of an excitation tube, POF and reflecting mirror.

Further, the excitation light irradiation device may be formed of a luminescence device of, for example, a ring shape or circular cylindrical shape, instead of the excitation tube. Since the luminescence device can be made extremely small, it is convenient in case the induced emission material having a short area doped in the POF length direction is used. For example, rare earth ion and organic dye can be used as the induced emission material. Incidentally, in order to effectively irradiate the POF with the emitted beam from the luminescence device, it is preferable to form an outer surface with a reflecting mirror.

According to the POF continuous optical amplifier of the present invention, the POF doped with the induced emission material is irradiated with the pump light from the excitation tube to thereby form an inversion population. A signal light whose fluorescence wavelength is in the fluorescence wavelength spectrum region of the induced emission material propagates through the inversion population area, so that the induced emission takes place and the optical amplifier is carried out.

Next, selection of the induced emission material for POF and the excitation tube according to the present invention are explained.

As methods for exciting the induced emission material in the POF amplifier, mainly, there are two methods of a coaxial excitation and a transverse excitation. While the coaxial excitation method has an advantage such that an pump light density can be maintained at a high level across the length direction of the POF, the exciting state is not uniform in the length direction of the POF. Also, in the coaxial excitation method, it is preferable that a gain of the pump light at the end face of the POF is more than 0, and the pump light density required at the incidence end becomes considerably high when it is compared with the transverse excitation.

Further, in the transverse excitation method, it is possible to raise the dope density of the induced emission material from one thousand to ten thousand times when it is compared with the coaxial direction excitation. Therefore, in case the transverse excitation is carried out, sufficient gain can be obtained even with an extent that the pump light density is slightly over a threshold of amplification.

Therefore, in the present invention, the transverse excitation is used as the excitation method in order to amplify with a continuous light. Incidentally, it is preferable that a length of the POF is made less than several tens of cm for the practical use.

Hereinunder, the selection of the induced emission material and a method for determining the length of the excitation tube according to the present invention are explained in detail with reference to FIGS. 1 and 2.

In case the length of the excitation tube 1 to be used is, for example, the same as that of the POF 12 doped with the induced emission material 18, the POF continuous optical amplifier 10 is determined by the diameter of the POF core 14 to be used, induced emission material 18 and a way of distribution in the radial direction of the dope area in the POF. Incidentally, in FIG. 2, arrows 8 in the radial direction show the pump lights.

Even if an incidence pump light intensity is damped with an exponential function relationship, it is practically sufficient. Assuming that a radial vector axis of the POF is an axis r, variation of the incidence pump light intensity in the r direction is expressed by the following equation:

$$Ip(r)=Ip0\exp(-N\sigma pa(rd/2-r)) \tag{1}$$

wherein Ip(r) represents a pump light intensity at r, in which r in a bracket is variable number, Ip0 denotes intensity of an incident pump light on POF surface; r represents a distance from the fiber center along the radial vector axis ($0 \leq r \leq rd/2$), rd is a diameter of a doped area, N represents a density of the induced emission material, and σpa represents an absorption cross section at the pump light wavelength of the induced emission material.

Further, there is adopted a rate equation considering a real absorption emission spectrum as a mechanism of the optical amplification in the POF amplifier to which the induced emission material is added.

Assuming that a length direction of the POF is taken as a Z axis, an incidence plane of the signal light z=0, and a signal light intensity, i.e. power density, is Is(z), a gain G of the POF with a length L is expressed as follows:

$$G=Is(L)/Is(0) \tag{2}$$

Assuming that the induced emission material is substantially distributed symmetrically from the center of POF, the gain G as a function of the length L of the exciting tube is obtained from the differential equation in the axis z direction of the signal light intensity, i.e. power density, Is(z), and the gain G is given as follows:

$$G=\exp[RNL\{\sigma se\sigma paW)/(2\pi r0nE)-\sigma saL/\tau\}/\{(\sigma paW)/(2\pi r0nE)+L/\tau\}] \tag{3}$$

wherein exp represents an exponential function symbol, N represents a density of the induced emission material, σpa denotes an absorption cross section at the pump light wavelength of the stimulated emission material, σsa represents an absorption cross section at the signal light wavelength, σse represents an emission cross section at the signal light wavelength, W is an energy of pump light, L is a length of an amplifier, i.e. excitation tube, τ is a lifetime of the induced emission POF, R represents a percentage of overlapping ratio of the dope area with the induced emission material in a signal light intensity distribution, r0 represents a radius of an area where an intensity of the pump light is saturated, π is a circular constant, n is a refractive index of the POF for the pump light, E shows an energy of a pump, and E equal to hν where h and ν represents Plank constant and frequency of the pump light, respectively.

First, conditions of the dimensions with which the excitation tube can be practically produced are explained.

The density of the induced emission material is estimated as follows. Assuming that the pump light passes through the dope area of the induced emission material and its intensity becomes 1/e, from equation (1), the following equation is obtained:

$$N \sim 1/\sigma pa rd \tag{4}$$

and this value is set up as a standard. Here, rd represents the diameter of the dope area.

In order to use the doped induced emission material effectively, it is desirable that the area where the pump light intensity is sufficiently high, i.e. the area where the intensity of the pump light is saturated, substantially coincides with the area doped with the induced emission material. Thus, rd~2r0.

Since an approximate gain is determined by a size of a gain factor γ, in case the signal light is amplified, the signal light intensity becomes:

$$Is(L) \sim Is(0)\exp[2RN\sigma saL] \tag{5}$$

In the above, γ=σseN2−σsaN1, N1 is a density of the induced emission material in the ground state, N2 is a density of the induced emission material in the excited state. Incidentally, in the equation, the reason why σsa appears instead of ase is that the vicinity of the threshold of the amplification and σse>σsa are taken into consideration.

Accordingly, an exponent to determine the gain G can be obtained from equations (4) and (5), as follows:

$$2RN\sigma saL=2R(1/\sigma pard)\sigma saL \tag{6}$$

Assuming that the gain is 4.34 dB(e times), 2R(1/σpard)σsaL~1, i.e. rd/2RL~σsa/σpa. Assuming that the gain is 30 dB (1000 times), 2R(1/σpard)σsaL~7, i.e. 7rd/2RL~σsa/σpa.

Therefore, in case a relationship among an optical constant, rd, L, σsa and σpa of the induced emission material is in a range of:

$$rd/2RL \leq \sigma sa/\sigma pa \leq 7rd/2RL \tag{7}$$

practically, an area from 4.34 to 30 dB can be covered.

Accordingly, a ratio of the emission cross section σsa of the signal light wavelength and the emission cross section σpa of the pump light wavelength in the induced emission material of the present invention satisfies the equation (7).

For example, assuming that L~20 cm, the above relationship becomes approximately as follows:

$$0.05rd/2R<H<0.35rd/2R \tag{8}$$

wherein, H=σsa/σpa.

On the other hand, assuming that the gain is in about 10 dB, from equation (6), $$\sigma saL/\sigma pard \sim (ln10)/2R \tag{9}$$

wherein ln represents a natural logarithm symbol.

Also, since the exponent in equation (3) is larger than 0, the condition under which the gain can be obtained is determined by the following equation:

$$(\sigma se\sigma paW)/(2\pi r0nE)-\sigma saL/\tau>0 \tag{10}$$

wherein 2r0=rd.

Therefore, the following equation is held:

$$\tau\sigma se > (\pi r d n E)(\sigma sa L r d/\sigma pa r d W) \sim (\pi r d n E) r d (\ln 10)/2RW \quad (11)$$

Here, in case $n=1.52$, $E=3.12\times10^{-19}$, $R=0.07688$, $\pi=3.14$, a threshold of amplification is 10 watt, the following equation can be held.

$$\tau\sigma se > 2.3\times^{-18} r d^2 \text{ (cm}^2 \text{ second)} \quad (12)$$

Therefore, since the threshold can be made small by using the induced emission material having a large ase to satisfy equation (12), an efficient optical amplifier can be obtained. For example, in case $rd=50\times10^{-4}$ cm, $$\tau\sigma se > 0.6\times10^{-22} \text{ (cm}^2 \text{ second)} \quad (13)$$

Accordingly, in order to suppress the pump light intensity as small as possible to amplify with the CW light and to obtain sufficient gain, it is required that the above mentioned equations (7) and (12) are satisfied at the same time. Thus, in case the excitation tube is made, for example, in a length of about 20 cm for practical use, a gain of about 10 dB which is necessary in practical use can be obtained, and equations (8) and (13) are required to be satisfied as the induced emission material.

Further, with reference to a lifetime $\tau$ of the induced emission material, if a pump light irradiation stop time is less than $\tau$, namely the off time is less than $\tau$, preferably, considerably smaller than $\tau$, the irradiation time is substantially the same as that of the continuous irradiation.

Accordingly, the excitation tube of the present invention does not always continuously irradiate the pump light, and may irradiate pulse light, so that the POF doped with the induced emission material can be continuously excited.

Incidentally, the derivation of equations (7) and (12) is not limited to the level model of the induced emission material, but can be applied generally.

Next, selection of the induced emission material is described.

Since a core diameter of the POF is substantially fixed in fact and as the rd becomes larger R becomes larger, in case the value of $\sigma sa/\sigma pa$ in equation (8) is smaller, the length of the optical amplifier becomes longer.

In the rare earth chelate, when a value at a peak where the absorption cross section for the pump light and signal light becomes maximum is used, the value of the $\sigma sa/\sigma pa$ becomes about 10-6.

Therefore, in the present invention, the pump light wavelength is pushed off from the absorption peak wavelength of the rare earth chelate to make the value of $\sigma sa/\sigma pa$ greater, so that while the value at the peak of the emission cross section in the signal light wavelength is used, the value of $\sigma sa/\sigma pa$ is held in about 10-3.

For example, in case the rare earth chelate, such as a neodymium chelate, is used as the induced emission material, the value of $\sigma sa/\sigma pa$ can be held in about 10-3.

Incidentally, the absorption spectrum characteristics of the rare earth chelate are determined by an organic compound ligand having the absorption cross section of approximately from 100 to 1000 times as large as the rare earth ion used as a central metal ion. Since the ligand is an organic compound, it has a high flexibility in its design, and products having various wavelengths and absorption cross sections can be produced.

Also, since the value of rd/L in equation (7) is in about 10 −6 in case of a glass fiber, 10–3 to 10–4 in case of the POF, and $\sigma sa/\sigma pa$ is 0.1, the area shown in equation (7) does not overlap. Thus, equation (7) is impertinent to the optical amplifier of the glass fiber which has already been used practically.

Further, while a relational equation of rd/L and $\sigma sa/\sigma pa$ greatly affects the gain, if the value of $\sigma sa/\sigma pa$ in the POF is made in about 10–3 to 10–4, equation (7) is satisfied.

Also, when the value of $\tau\sigma se$ in equation (12) becomes large, the threshold is lowered. For example, when the threshold power is less than 10 watt, it is considered as follows:

When the optical constant already shown is used, in case of the rare earth chelate, $\tau\sigma se$ becomes about $5\times10^{-23}$ (cm$^2$ second) which is the threshold value of about 10 watt.

Figure 6:
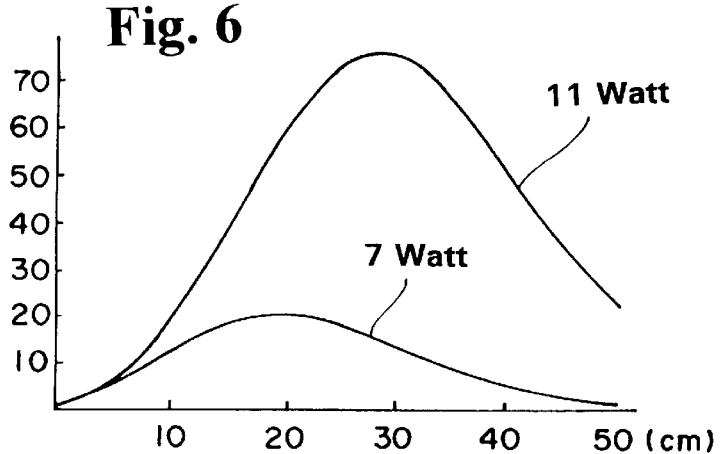
FIG. 6 is a graph for showing an example of the signal gain dependence on the length of the POF amplifier where a neodymium chelate is doped to the POF of the invention and a power W of the pump light is used as a parameter.

An example where calculations were made by using a power W of the pump light as a parameter when a neodymium chelate was doped by using equation (3), is shown in FIG. 6.

Incidentally, in the calculation for FIG. 6, the following was used: $n=1.5$, $N=1\times10^{21}$ cm$^3$, $\sigma pa=6\times10^{-18}$ cm$^2$, $\sigma sa=5\times10^{-21}$ cm$^2$, $\sigma se=1\times10^{31\ 20}$ cm$^2$, $\tau=5$ m·second, $R=0.07688$, $r0=25$ $\mu$m (core diameter=250 $\mu$m, the dope area of the induced emission material is 25 $\mu$m in radius from the center of the POF) and $E=3.12\times10^{-19}$ J ($v=642$ nm).

As reference literatures for showing these values, there are mentioned "ACTIVE PLASTIC OPTICAL FIBER" issued at The 1992nd Keioh Gijuku University Master's Thesis, and "PLASTIC OPTICAL AMPLIFIER" issued at The 1995th New Energy Industrial Technique Overall Development Mechanism Entrustment Affairs Research Result Report (published by Keioh Gijuku University in March, 1997).

As apparent from FIG. 6, in case the power W of the pump light is 7 watt, the maximum gain can be obtained by L=about 20 cm, and in case the power W of the pump light is 11 watt, the maximum gain can be obtained by L=about 30 cm. From these, it is shown that the excitation tube should be made about 20 cm to 30 cm in length, which indicates that the length of the excitation tube is in a practically producible range.

The length of the POF for continuous amplification or the excitation tube can be designed to be 20–30 cm (practically convenient length) when an induced emission material is used by using the designing method of the present invention. It is apparent from FIG. 6 that although the gain becomes smaller, the applicable length of the exciting tube is ranging from 0.5 cm to 50 cm.

On the other hand, in case an organic dye or a rare earth ion is used as the induced emission material, $\sigma sa/\sigma pa$ becomes about 0.1 for the most of the cases, and in case the doping density is high as in the present invention, the length of the excitation tube becomes extremely short in about 1 mm. Also, cse for the respective cases are about $10^{-25}$ and $10^{-23}$.

Figure 7:
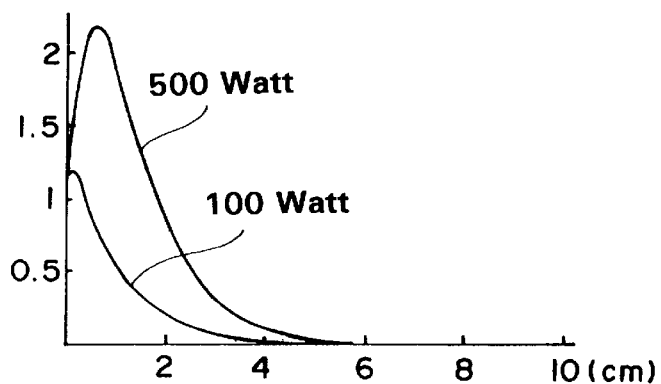
FIG. 7 is a graph for showing an example of the signal gain dependence on the length of the POF amplifier where a rare earth ion is doped to a glass fiber as a POF of the invention and the power W of the pump light is used as a parameter.
Figure 8:
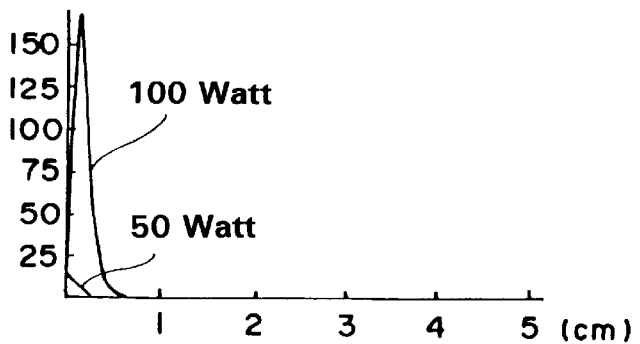
FIG. 8 is a graph for showing an example of the signal gain dependence on the length of the POF amplifier where an organic dye is doped to a POF of the invention and the power W of the pump light is used as a parameter.

FIGS. 7 and 8 show respectively the relation between the length of the excitation tube and the gain in case of the glass fiber doped with rare earth ions and POF doped with organic dyes using exactly the same exciting method as that of the present invention. As a typical dopant, Eu (Europium) ion was used for the former case and Rhodamine B for the latter. R was estimated to be 0.9 in the calculation.

Incidentally, in case the glass fiber was doped with the rare earth Eu ion, the followings were adopted: $\sigma pa=$ absorption cross section of the pump light=$1\times10^{-20}$ cm$^2$, $\sigma sa=$emission cross section in the signal light wavelength= $2\times10^{-21}$ cm$^2$, $\sigma se=$absorption cross section in the signal light wavelength=$1\times10^{-20}$ cm$^2$, n=refractive index of the fiber with respect to the pump light=1.5, R=percentage of portions where signal light intensity distribution overlaps the area doped with the induced emission material=0.9, r0=radius of an area where the intensity of the pump light is saturated=10 $\mu$m, E=energy of a pump=1.24/0.642×1.62× $10^{-29}$ J(Joule), and $\tau$=lifetime of the induced emission material=0.5×$10^{-3}$ second.

Also, in case the POF was doped with the organic dye, i.e. Rhodamine B, the followings were adopted: $\sigma$pa=absorption cross section of the pump light=7×$10^{-16}$ cm$^2$, $\sigma$sa=emission cross section in the signal light wavelength=3×$10^{-17}$ cm$^2$, $\sigma$se=absorption cross section in the signal light wavelength=1×$10^{-16}$ cm$^2$, n=refractive index of the fiber with respect to the pump light=1.52, r0=radius of an area where the intensity of the pump light is saturated=10 $\mu$m (core diameter=250 $\mu$m), E=energy of a pump=1.24/0.532×1.62×$10^{-19}$ J(Joule), $\tau$=lifetime of the induced emission material=5×$10^{-9}$ second, and N=density of the induced emission material=6×$10^{-18}$ cm$^3$.

As apparent from FIGS. 7 and 8, irradiation power of the pump light source should be more than several hundred watt in order to obtain sufficient gain in both cases and these examples are not suitable for the amplification by the method mentioned in the present invention.

Therefore, in case the organic dye and rare earth ion are used as the induced emission material, it is required to use a luminescent device, dimensions of which can be made as small as possible, to thereby obtain a sufficient gain and to reduce a pump light intensity. For example, there is a luminescence device or light emitting diode having, for example, a ring shape.

However, in the case of glass fiber doped with rare earth ions, continuous amplification is observed via the coaxial direction excitation method. In the case of POF doped with dyes, a pulse signal light is amplified with high power pulse pump light.

From the above results, it is preferable to use the POF doped with the rare earth chelate so that the exciting light tube can be easily produced with usable dimensions and a cooling device is not required.

Next, selection of a pump light wavelength for the excitation tube or the like is explained.

In the optical amplifier, it is preferable that $\sigma$se and $\sigma$pa of the induced emission material are separated with respect to the wavelength and that $\tau\sigma$se is as large as possible. Also, in the POF continuous optical amplifier of the present invention, it is required that $\sigma$pa>>$\sigma$se>$\sigma$sa.

Figure 9:
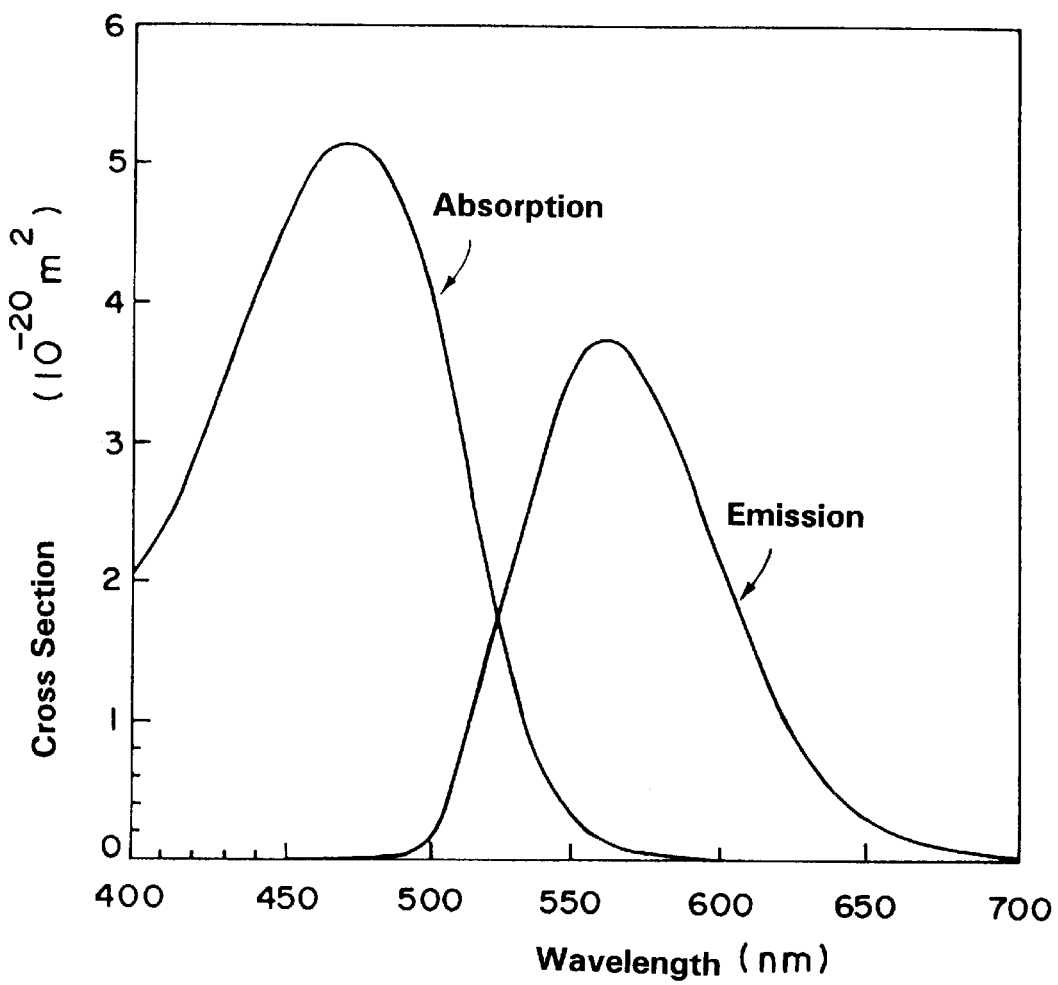
FIG. 9 is a spectrum showing spectra of absorption cross section and emission cross section of an organic dye DCM which is doped into PMMA as the POF of the invention.

FIG. 9 shows absorption cross sections and emission cross sections in case DCM as the organic dye was doped into polymethyl methacrylate (hereinafter referred to as PMMA) of the POF.

As shown in FIG. 9, in case the wavelength range including the peak value of absorption cross section and that of emission cross section substantially overlaps, when the pump light wavelength and the signal light wavelength are determined to satisfy $\sigma$pa>>$\sigma$se, the value of $\sigma$se becomes too small and sufficient optical amplification can not be made.

On the contrary, in case of the rare earth chelate, when the respective peak values of $\sigma$se and $\sigma$pa are used, since $\sigma$se/$\sigma$pa is $10^{-6}$ ~1, the above described condition can be satisfied to thereby satisfy equation (7).

Figure 10A:
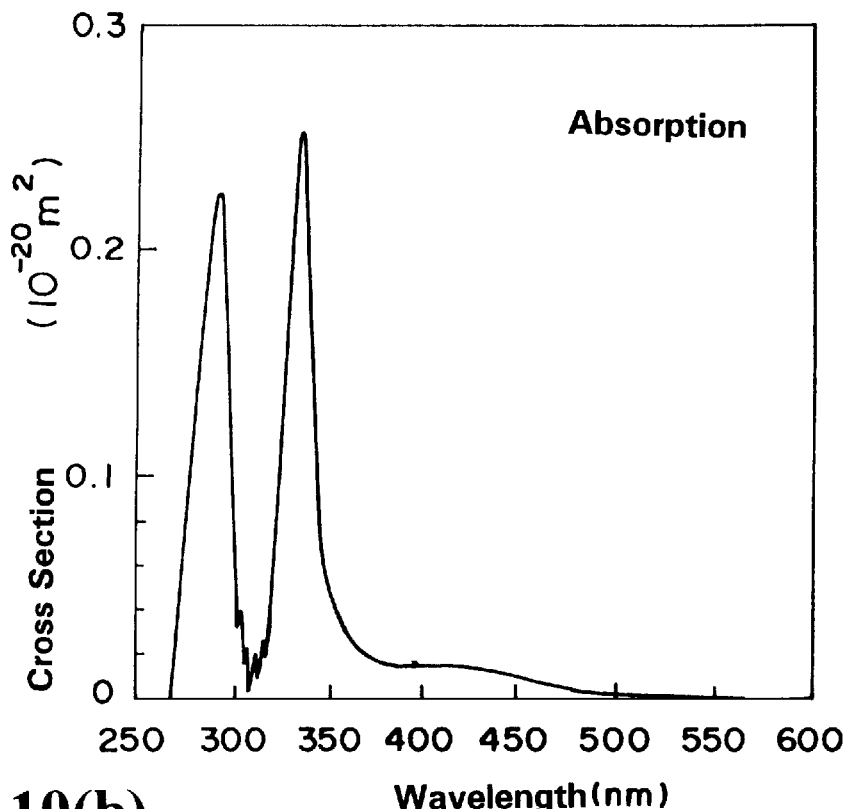
FIGS. 10(a) and 10(b) are spectrum drawings for showing absorption cross sections and emission cross sections when terbium chelate as the rare earth chelate is doped into PMMA as the POF of the invention, respectively.
Figure 10B:
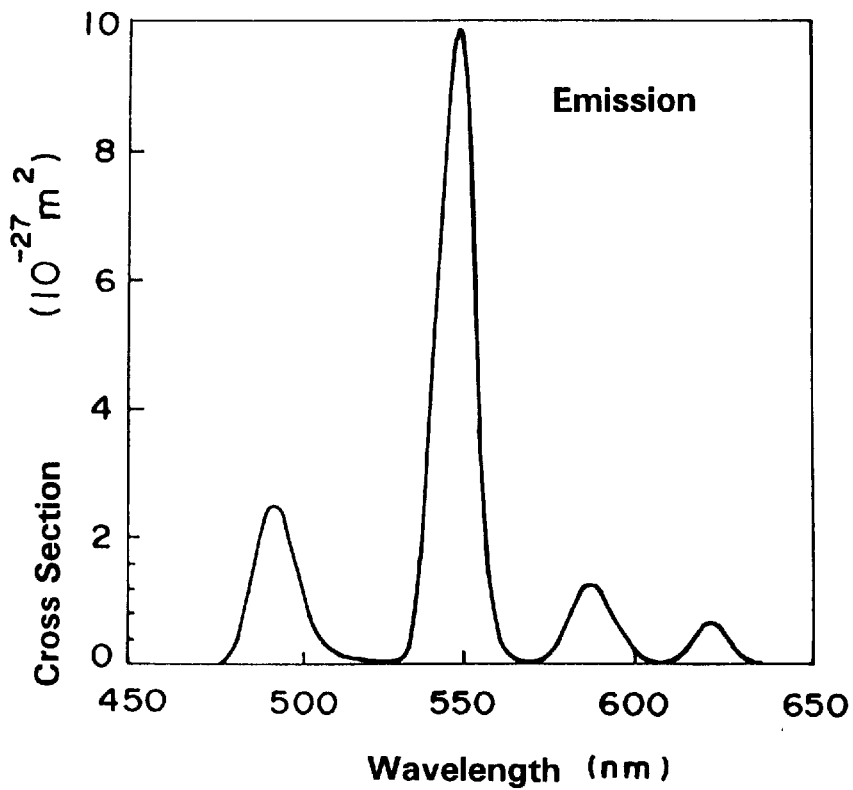

FIGS. 10(*a*) and 10(*b*) show absorption cross sections and emission cross sections when terbium chelate as the rare earth chelate was doped into PMMA of the POF, respectively.

As shown in FIGS. 10(*a*) and 10(*b*), for example in case of terbium chelate, the wavelength range from the minimum absorption wavelength to the next minimum absorption wavelength, having one absorption peak, in the absorption cross section spectrum and the wavelength range from the minimum luminescence wavelength to the next minimum luminescence wavelength, having one luminescence peak in the emission cross section spectrum are separated, and moreover, the ratio $\sigma$se/$\sigma$pa of the emission cross section and the absorption cross section is in about $10^{-6}$.

Thus, through selection of the rare earth chelate, a value in the vicinity of the peak is used as $\sigma$se, and a wavelength of the pump light is determined to satisfy equation (7) and the pump light to thereby fix an emission wavelength of the excitation tube.

Also, at this time, as shown by equation (1), while the pump light intensity depends on a product of the density N of the induced emission material and $\sigma$pa, in the case of the present invention, since the density N can be controlled to be high, the pump light intensity can be made extremely low.

Accordingly, in the POF continuous optical amplifier according to the present invention, even if the pump light intensity is controlled to be low in order to amplify with the C light, it is possible to obtain a large gain by using a signal light in the vicinity of the peak wavelength of the emission cross sectional spectrum, and a wavelength, as the pump light, when the absorption cross section is selected to satisfy equation (7).

Next, a method for manufacturing the POF doped with a chelate compound is explained.

A mixed solution of methyl methacrylate as a monomer, benzoyl peroxide as a polymerization initiator and n-butyl mercaptan as a chain transfer agent was polymerized to produce a hollow-shape polymethyl methacrylate.

Methyl methacrylate, perhexa 3M as a polymerization initiator, phthalic acid benzil n-butyl as a low molecule to raise efficiency of optical amplification and a chelate compound were filled into a central portion of the hollow tube, and polymerized to produce a preformed rod containing the chelate compound in the core.

The preformed rod thus obtained was heated to a temperature more than a polymerization temperature Tg and subjected to heat drawing to prepare a POF doped with the chelate compound.

The chelate compound can be doped to a density of about 20,000 to 30,000 ppm.

In the optical amplifier of the invention, light from the light source, such as laser, LED and so on, may be introduced into the optical amplifier to intensify the light and to emit therefrom to other device, such as optical fiber, optical device, photodiode and so on. Especially, when a light is divided by an optical device, the intensity or strength of the divided light may be properly increased by the optical amplifier.

In case the optical amplifier of the invention is combined with a wavelength changing device, the optical amplifier can amplify simultaneously lights with different wavelengths to provide dual optical transmission. Also, the optical amplifier may be situated between the optical fibers with different diameters, so that the optical amplifier may be used as a connector.

Further, in case the optical amplifier is combined with an optical device which can select wavelength, it is possible to provide a fiber type compact light source which can select light components with more than two wavelengths. Also, in case a laser activation material to be added to the optical fiber of the amplifier and an excitation light are properly selected, it is possible to obtain a light with a specific wavelength which can not be obtained in the present laser technology.

As described hereinabove, the POF continuous optical amplifier according to the present invention has an effect such that the signal lights can substantially be subjected to CW light amplification by continuously irradiating the pump light of the excitation tube or the luminous element to the POF doped with the induced emission material, or by irradiation including the pump light irradiation stop time that is less than $\tau$ with respect to $\tau$ of the induced emission material.

Also, the excitation tube of the present invention has an effect such that by continuous irradiation with a low pump light intensity or irradiation including the pump light irradiation stop time less than $\tau$ with respect to $\tau$ of the induced emission material, optical amplification can be made by optically exciting the induced emission material doped in the POF. Moreover, the excitation tube of the invention can be manufactured with practically usable dimensions.

While the invention has been explained with reference to the specific embodiments of the invention, the explanation is illustrative and the invention is limited only by the appended claims.

What is claimed is:

1. A plastic optical fiber continuous optical amplifier comprising:

irradiation means for irradiating a pump light at a specified wavelength, said irradiation means being a pump light irradiation device and including inner and outer tubes, an exciting gas sealed between the inner and outer tubes, and electrodes disposed at two ends of the tubes; and a plastic optical fiber disposed in the irradiation means and having an induced emission material doped into the plastic optical fiber in a dope area, said induced emission material having an absorption wavelength range including the pump light wavelength of the irradiation means, said dope area having a length corresponding to a length of the irradiation means so that a signal light passing through the plastic optical fiber is optically amplified by the pump light of the irradiation means continuously irradiated to the plastic optical fiber.

2. A plastic optical fiber continuous optical amplifier as claimed in claim 1, wherein each of said electrodes has a ring shape.

3. A plastic optical fiber continuous optical amplifier as claimed in claim 1, wherein said irradiation means is a ring shape luminescence generating device.

4. A plastic optical fiber continuous optical amplifier comprising:

irradiation means for irradiating a pump light at a specified wavelength; and a plastic optical fiber disposed in the irradiation means and having an induced emission material doped into the plastic optical fiber in a dope area, said induced emission material having an absorption wavelength range including the pump light wavelength of the irradiation means, said dope area having a length corresponding to a length of the irradiation means so that a signal light passing through the plastic optical fiber is optically amplified by the pump light of the irradiation means continuously irradiated to the plastic optical fiber, wherein said irradiation means continuously irradiates the pump light for excitation from a side of the plastic optical fiber to optically amplify the signal light, in which following equations are satisfied:

(a) $rd/2RL \leq \sigma sa/\sigma pa \leq 7rd/2RL$, and (b) $\tau \sigma se > (\pi rdnE)(\sigma saLrd/\sigma pardW)$ wherein, rd represents a diameter of an area doped with the induced emission material; L represents a length of the irradiation means same as that of the plastic optical fiber doped area with the induced emission material; $\sigma sa$ is an absorption cross section at a signal light wavelength of the induced emission material; $\sigma pa$ is an absorption cross section at the pump light wavelength of the induced emission material; $\sigma se$ is an emission cross section at the signal light wavelength of the induced emission material; R is a percentage of an overlapping portion of the dope area doped with the induced emission material in a signal light intensity distribution; $\tau$ is a lifetime of the induced emission material; W is power of the pump light; n is a refractive index of the pump light in the plastic optical fiber with respect to the pump light; and $\pi$ represents a circular constant.

5. A plastic optical fiber continuous optical amplifier as claimed in claim 4, wherein the length of the irradiation means corresponding to the dope area is in a range from 0.5 cm to 50 cm.

6. A plastic optical fiber continuous optical amplifier as claimed in claim 4, wherein the induced emission material is selected from a group consisting of an organic dye, rare earth element and chelate compound satisfying a threshold condition.

7. A plastic optical fiber continuous optical amplifier as claimed in claim 4, wherein the induced emission material is distributed symmetrically from a center of the plastic optical fiber.

8. A plastic optical fiber continuous optical amplifier as claimed in claim 4, wherein the dope area in the plastic optical fiber doped with the induced emission material is substantially coincides with the area where the intensity of the pump light irradiating the plastic optical fiber from the side of the plastic optical fiber is saturated.

9. A plastic optical fiber continuous optical amplifier as claimed in claim 4, wherein the wavelength range from the minimum absorption wavelength to a next minimum absorption wavelength, having one absorption peak, in the absorption cross section spectrum of the induced emission material doped in the plastic optical fiber and the wavelength range from the minimum luminescence wavelength to a next minimum luminescence wavelength, having one luminescence peak, in the emission cross section spectrum of the material are separated, and the wavelength where the emission cross section becomes nearly maximum is taken as the signal light wavelength.

10. A plastic optical fiber continuous optical amplifier as claimed in claim 4, wherein a luminescence spectrum for the signal light wavelength of the induced emission material doped to the plastic optical fiber is separated from an absorption spectrum for the pump light wavelength of the induced emission material, and the induced emission material is selected such that the wavelength where the emission cross section of the induced emission material becomes almost maximum substantially coincides with the signal light wavelength.

11. A plastic optical fiber continuous optical amplifier as claimed in claim 4, wherein a continuous irradiation of the pump light includes a quasi-CW light with the irradiation operating stop time less than a lifetime $\tau$ of the induced emission material, or a light which works with the frequency more than $1/\tau$.

12. An exciting light tube for continuously irradiating a pump light to a plastic optical fiber in a transverse excitation and having a length L satisfying a following equation:

$rd/2RL \leq \sigma sa/\sigma pa \leq 7rd/2RL$, wherein rd represents a diameter of an area doped with an induced emission material of the plastic optical fiber; L is a length of a pump light irradiating device same as that of an area doped with the induced emission material; σsa represents an absorption cross section in a signal light wavelength of the induced emission material; σpa is an absorption cross section in a pump light wavelength of the induced emission material; σse is an emission cross section in the signal light wavelength of the induced emission material; and R represents a percentage of an overlapping area doped with the induced emission material in a signal light intensity distribution.

13. An exciting light tube as claimed in claim 12, wherein a continuous irradiation includes a pump light irradiation stop time less than $1/\tau$ with respect to a lifetime $\tau$ of the induced emission material.

14. An exciting light tube as claimed in claim 12, wherein the emission cross section in the signal light wavelength of the induced emission material doped in the plastic optical fiber and the absorption cross section in the pump light wavelength of the induced emission material are separated in wavelengths, and the wavelength of pump light is slightly detuned from the wavelength at which the absorption cross section of the induced emission material becomes maximum.

15. An exciting light tube as claimed in claim 12, wherein said exciting light tube has a length in a range of 0.5 cm to 50 cm.

16. An exciting light tube as claimed in claim 12, wherein the exciting light tube has electrodes on both ends thereof and a double tube structure for sealing therein gas or material whose luminescence wavelength is substantially same as that of the absorption wavelength of the induced emission material.

17. A plastic optical fiber continuous optical amplifier comprising:

irradiation means for irradiating a pump light; and a plastic optical fiber disposed in the irradiation means and having an induced emission material doped therein for causing induced emission;

wherein said irradiation means continuously irradiates the excitation light for causing the optical material in an excitation condition from a side of the plastic optical fiber to optically amplify a signal light, in which following equations are satisfied:

(a) $rd/2RL \leq \sigma sa/\sigma pa \leq 7rd/2RL$, and (b) $\tau\sigma se > (\pi rdnE)(\sigma saLrd/\sigma pardW)$ wherein, rd represents a diameter of an area doped with the induced emission material; L represents a length of the irradiation means same as that of a plastic optical fiber doped area with the induced emission material; σsa is an absorption cross section at a signal light wavelength of the induced emission material; σpa is an absorption cross section at the pump light wavelength of the induced emission material; σse is an emission cross section at the signal light wavelength of the induced emission material; R is a percentage of an overlapping portion of the dope area doped with the induced emission material in a signal light intensity distribution; $\tau$ is a lifetime of the induced emission material; W is power of the pump light; n is a refractive index of the pump light in the plastic optical fiber with respect to the pump light; and $\pi$ represents a circular constant.

18. A plastic optical fiber continuous optical amplifier as claimed in claim 17, wherein said irradiation means is formed of an excitation tube having inner and outer tubes, excitation gas sealed between the inner and outer tubes, and electrodes for excitation.

19. A plastic optical fiber continuous optical amplifier as claimed in claim 17, wherein said plastic optical fiber is coaxially fixed to the pump light irradiation device.

20. A plastic optical fiber continuous optical amplifier as claimed in claim 17, wherein said plastic optical fiber is coaxially fixed in the pump light irradiation device with an adhesive having light transmittance characteristics to allow the light for exciting the induced emission material doped in the plastic optical fiber to pass therethrough and to block ultra-violet rays against promoting dissolution of plastic.

* * * * *